(12) United States Patent
Srivastava et al.

(10) Patent No.: US 11,483,750 B1
(45) Date of Patent: Oct. 25, 2022

(54) USER EQUIPMENT (UE) MOBILITY BETWEEN EVOLVED PACKET SYSTEM (EPS) AND FIFTH GENERATION (5G) SYSTEM (5GS) USING A SIMPLIFIED 3GPP CORE ARCHITECTURE FOR INTERWORKING

(71) Applicant: Cisco Technology, Inc., San Jose, CA (US)

(72) Inventors: Anal Srivastava, Cupertino, CA (US); Srinath Gundavelli, San Jose, CA (US); Oliver James Bull, Bristol (GB); Vimal Srivastava, Bangalore (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 16 days.

(21) Appl. No.: 17/224,621

(22) Filed: Apr. 7, 2021

(51) Int. Cl.
*H04W 36/22* (2009.01)
*H04W 36/30* (2009.01)
(Continued)

(52) U.S. Cl.
CPC .......... *H04W 36/22* (2013.01); *H04W 8/08* (2013.01); *H04W 28/0268* (2013.01);
(Continued)

(58) Field of Classification Search
CPC ....... H04W 36/22; H04W 76/12; H04W 8/08; H04W 28/0268; H04W 28/12; H04W 36/12; H04W 48/16
(Continued)

(56) References Cited

U.S. PATENT DOCUMENTS 10,880,802 B1 * 12/2020 Bakker ................. H04W 60/00
2018/0352484 A1   12/2018 Yoshizawa et al.
(Continued)

FOREIGN PATENT DOCUMENTS

WO    2018232605 A1    12/2018
WO    2020034950 A1    2/2020
(Continued)

OTHER PUBLICATIONS

ETSI, "Universal Mobile Telecommunications System (UMTS); LTE; 3GPP Evolved Packet System (EPS); Evolved General Packet Radio Service (GPRS) Tunnelling Protocol for Control plane (GTPv2-C); Stage 3 (3GPP TS 29.274 version 15.4.0 Release 15)," ETSI TS 129 274 V15.4.0, 3GPP 5G A Global Initiative, Jul. 27, 2018, pp. 1, 2, 200-236.

(Continued)

*Primary Examiner* — Nghi H Ly
(74) *Attorney, Agent, or Firm* — Edell, Shapiro & Finnan, LLC

(57) ABSTRACT

An enterprise private network includes a simplified Third Generation Partnership Project (3GPP) core architecture for interworking between an Evolved Packet System (EPS) and a Fifth Generation (5G) system (5GS). The architecture includes an Evolved Packet Core (EPC) control plane (CP) (EPC CP) unit and a 5G core (5GC) CP (5GC CP) unit. The 5GC CP unit receives, from the EPC CP unit via an N26 interface, a message indicating a forward relocation request responsive to an indication of a handover of a Packet Data Network (PDN) connection at a user plane node from the EPS to the 5GS. The 5GC CP node establishes a Protocol Data Unit (PDU) session corresponding to the PDN connection based on PDN connection information in the message, which includes establishing a Quality of Service (QoS)

(Continued)

Flow corresponding to an EPS bearer, and manages the PDU session at the user plane node.

20 Claims, 8 Drawing Sheets

(51) Int. Cl.
  *H04W 28/02* (2009.01)
  *H04W 48/16* (2009.01)
  *H04W 28/12* (2009.01)
  *H04W 8/08* (2009.01)
  *H04W 76/12* (2018.01)
(52) U.S. Cl.
  CPC .......... *H04W 28/12* (2013.01); *H04W 36/30* (2013.01); *H04W 48/16* (2013.01); *H04W 76/12* (2018.02)
(58) Field of Classification Search
  USPC ....... 370/331, 329, 328, 338, 341, 345, 450; 455/436, 442
  See application file for complete search history.

(56) References Cited

U.S. PATENT DOCUMENTS

| | | |
|---|---|---|
| 2018/0376384 A1 | 12/2018 | Youn et al. |
| 2020/0092745 A1 | 3/2020 | Gundavelli et al. |
| 2020/0120570 A1 | 4/2020 | Youn et al. |
| 2020/0267606 A1* | 8/2020 | Huang-Fu ......... H04W 28/0268 |
| 2020/0359272 A1 | 11/2020 | Huang-Fu et al. |
| 2020/0367190 A1 | 11/2020 | Wang |
| 2021/0029608 A1 | 1/2021 | Dodd-Noble et al. |
| 2021/0297383 A1* | 9/2021 | Bagwell .............. H04L 63/0272 |
| 2021/0307030 A1* | 9/2021 | Clapp ............... H04W 72/1284 |

FOREIGN PATENT DOCUMENTS

| | | |
|---|---|---|
| WO | 2020104925 A1 | 5/2020 |
| WO | 2020160177 A1 | 6/2020 |

OTHER PUBLICATIONS

ETSI, "5G; Procedures for the 5G System (3GPP TS 23.502 version 15.2.0 Release 15)," ETSI TS 123 502 V15.2.0, 3GPP 5G A Global Initiative, Jun. 27, 2018, pp. 1, 2, 130-161.

ETSI, "LTE; Interface between the Control Plane and the User Plane nodes (3GPP TS 29.244 version 15.5.0 Release 15)," ETSI TS 129 244 V15.5.0, 3GPP 5G A Global Initiative, Jul. 1, 2019, 212 pages.

Cisco, "Ultra Cloud Core 5G Session Management Function, Release 2020.02—Configuration and Administration Guide," Americas Headquarters, Cisco Systems, Inc., Apr. 30, 2020, 90 pages.

* cited by examiner

US 11,483,750 B1

USER EQUIPMENT (UE) MOBILITY BETWEEN EVOLVED PACKET SYSTEM (EPS) AND FIFTH GENERATION (5G) SYSTEM (5GS) USING A SIMPLIFIED 3GPP CORE ARCHITECTURE FOR INTERWORKING

TECHNICAL FIELD

The present disclosure relates generally to telecommunications systems, and more particularly to techniques and mechanisms for user equipment (UE) mobility between an Evolved Packet System (EPS) and a Fifth Generation (5G) System (5GS) in an enterprise private network having a simplified Third Generation Partnership Project (3GPP) core architecture for interworking.

BACKGROUND

Traditionally, cellular networks have been designed according to Third Generation Partnership Project (3GPP) standards, such as Fourth Generation (4G)/Long-Term Evolution (LTE)/Evolved Packet Core (EPC) standards. The 3GPP-defined EPC of the Evolved Packet System (EPS) includes a Mobility Management Entity (MME), a Packet Data Network (PDN) Gateway (PGW), and a Serving Gateway (SGW). In a more advanced Control and User Plane Separation (CUPS) architecture of the EPC, the PGW may be separated into a PGW-Control Plane (PGW-C) and a PGW-User Plane (PGW-U), and the SGW may be separated into a SGW-Control Plane (SGW-C) and a SGW-User Plane (SGW-U).

Today, cellular networks are being upgraded or migrated to Fifth Generation (5G) technology. A 5G System (5GS) utilizes radio access technologies (RATs) and core functions that are different from the EPS. A 5G deployment is based on the 5G Core (5GC) defined in the 3GPP specifications, and includes functions such as an Access and Mobility Management Function (AMF), a Session Management Function (SMF), and a User Plane Function (UPF).

Interworking between 4G and 5G will play an important role in the deployment of 5G, which will initially rely on the 4G/LTE/EPC as its underlying system. Accordingly, appropriate interworking between EPS and 5GS may be essential for the success of 5G.

In the 3GPP architecture for interworking, an N26 interface between the MME (i.e. the EPC) and the AMF (i.e. the 5GC) has been introduced as an inter-core network (CN) interface for seamless session continuity for a single registration mode of a user equipment (UE). Here, the MME and AMF may exchange GPRS Tunneling Protocol (GTP) version 2 (GTPv2) messages via the N26 interface in order to transfer the UE's context, whether for a "connected mode" handover or an "idle mode" mobility event. In the architecture, the SMF and the PGW-C are provided as a combined entity (i.e. an SMF+PGW-C), and the UPF and the PGW-U are provided as a combined entity (i.e. a UPF+PGW-U). The SMF+PGW-C operates to maintain a control signalling session, via an N4/Sx interface, with the UPF+PGW-U for managing a Packet Data Unit (PDU) session/PDN connection for the UE. Since the SMF+PGW-C serves as a dedicated control plane "anchor" for the PDU session/PDN connection, seamless session continuity and IP address preservation are possible for a UE moving from one system to the other.

In comparison to 3GPP-based networks, enterprise private networks have traditionally been designed based on "Wi-Fi" technology according to the IEEE 802.11 family of standards. More recently, however, enterprise private 3GPP network deployments have been made possible with the offering of the Citizens Band Radio Service (CBRS) and other bands. These enterprise deployments have been designed based on the same backend service core as traditional 4G/LTE deployments, namely, the 3GPP-defined EPC.

Today, efforts are being made to upgrade or migrate enterprise private 3GPP networks from 4G/LTE/EPC to 5G (for "private 5G"). In some cases, an enterprise may have to host and manage all of the complex 3GPP radio and core network functions for both EPC and 5GC. This approach may be inefficient and even overcomplicated for enterprise deployments, which are typically much smaller than wide area network deployments.

Accordingly, it may be advantageous to provide a design having combined or integrated EPC/5GC core components and functionality for an enterprise network deployment, to provide meaningful consolidation and simplification for improved network management and operation. If the enterprise core is simplified in such a manner, however, interworking procedures between the EPS and the 5GS may need to be reconsidered.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

DESCRIPTION OF EXAMPLE EMBODIMENTS

Figure 1:
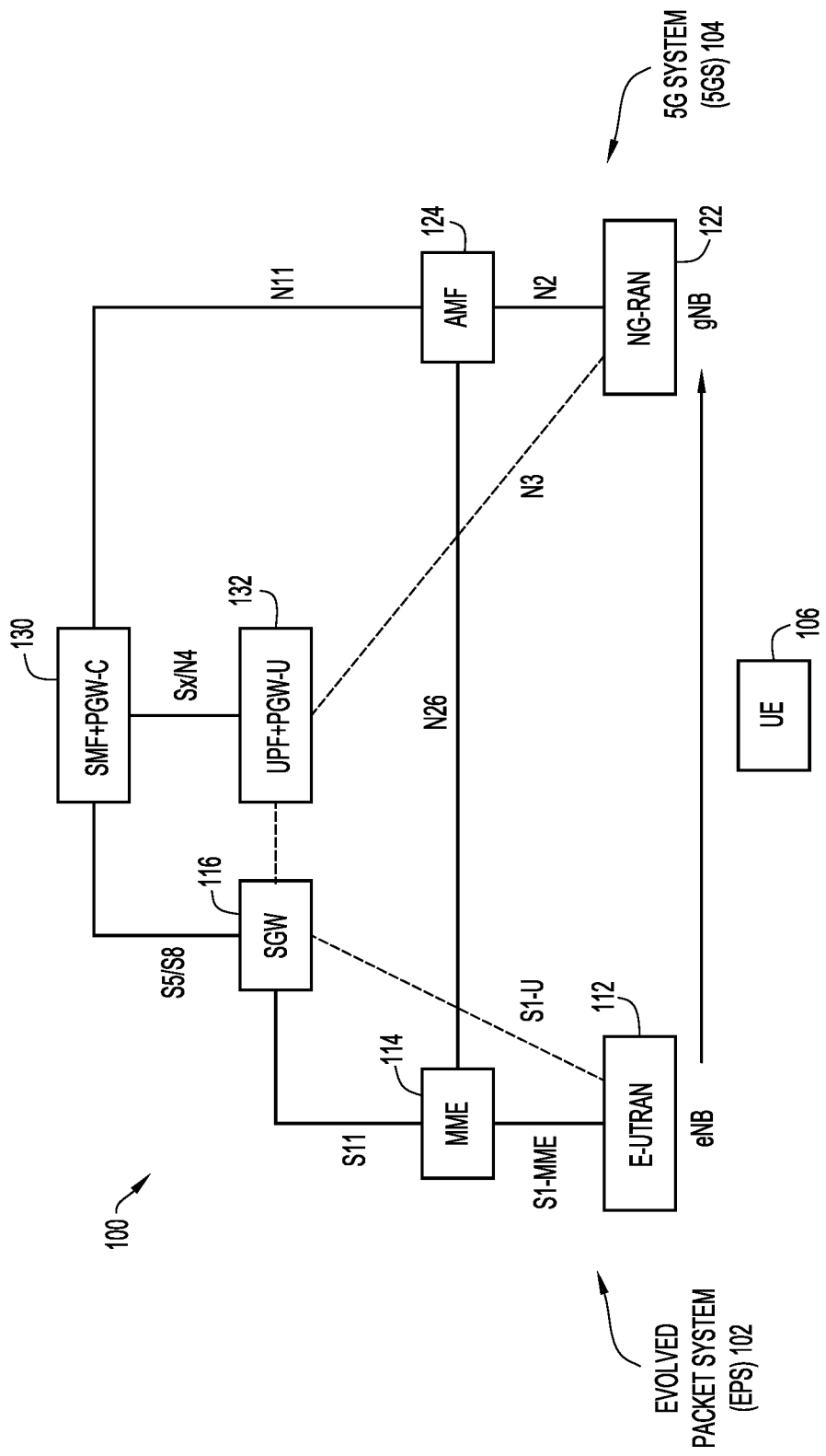
FIG. 1 is an illustrative representation of a Third Generation Partnership (3GPP) based mobile network having a 3GPP architecture for interworking between an Evolved Packet System (EPS) and a Fifth Generation (5G) System (5GS)

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

Techniques and mechanisms for user equipment (UE) mobility between an Evolved Packet System (EPS) and a Fifth Generation (5G) System (5GS) having a simplified Third Generation Partnership Project (3GPP) core architecture for interworking are described herein.

The simplified 3GPP core architecture for interworking may include a control plane node of an Evolved Packet Core (EPC) of the EPS and a control plane node of a 5G Core (5GC) of the 5GS. In one illustrative example, the control plane node of the EPC may comprise an EPC control plane (CP) (EPC CP) unit having functionality associated with a Mobility Management Entity (MME), a Serving Gateway-Control Plane (SGW-C), and a Packet Data Network (PDN) Gateway-Control Plane (PGW-C), without externally exposed or connected S11, S5, and S8 interfaces. The control plane node of the 5GC may comprise a 5GC CP unit having functionality associated with an Access and Mobility Management Function (AMF) and a Session Management Function (SMF), without an externally exposed or connected N11 interface. For interworking, the 5GC CP unit may be configured to interface with the EPC CP unit via an N26 interface.

In a first aspect of the present disclosure, a method for handover (e.g. "connected mode handover") between the EPS and the 5GS may be provided at the control plane node of the 5GC. The handover may be provided in relation to a PDN connection that is managed, via a control signaling session, by the control plane node of the EPC and anchored at a user plane node for forwarding traffic associated with a UE. In the method, the control plane node of the 5GC may receive, from the control plane node of the EPC via the N26 interface, a message which indicates a forward relocation request responsive to an indication of a handover of the PDN connection from the EPS to the 5GS. The message may include a Mobility Management (MM) context of the UE and PDN connection information which includes an EPS bearer context of an EPS bearer of the PDN connection. The control plane node of the 5GC may establish a Protocol Data Unit (PDU) session that corresponds to the PDN connection based on the PDN connection information. The establishing of the PDU session may include establishing a Quality of Service (QoS) Flow that corresponds to the EPS bearer based on the EPS bearer context. The establishing may be considered to be at least part of a converting or a re-creating of the PDN connection into the PDU session. The control plane node of the 5GC may send, to the user plane node, a message which indicates a session modification request for session modification and management of the PDU session, via the control signaling session, at the user plane node for forwarding the traffic associated with the UE.

In some implementations, the control plane node of the 5GC may establish the QoS Flow by selecting a QoS Flow Identifier (QFI) of the QoS Flow that corresponds to an EPS Bearer ID (EBI) of the EPS bearer. In some implementations, the control plane node of the 5GC may establish the QoS Flow by selecting a 5G QoS Identifier (5QI) of the QoS Flow that corresponds to a QoS Class Identifier (QCI) of the EPS bearer, and/or by selecting QoS Flow parameters of the QoS Flow that correspond to EPS bearer QoS parameters of the EPS bearer.

In some implementations, the message which indicates the forward relocation request may include a user plane node ID of the user plane node and a session ID of the control signaling session. Here, the control plane node of the 5GC may send, to the user plane node associated with the user plane node ID, the message which indicates the session modification request for session modification and management of the PDU session at the user plane node via the control signaling session associated with the session ID. In some further implementations, the message which indicates the session modification request may further include a control plane node ID of the control plane node of the 5GC. Here, the control plane node of the 5GC may send, to the user plane node associated with the user plane node ID, the message which indicates the session modification request for updating the user plane node with the control plane node ID of the control plane node of the 5GC for the control signaling session.

In some implementations, the message may further include updated uplink (UL) tunnel information for the PDU session. Here, the control plane node of the 5GC may send the message which indicates the session modification request for deleting, at the user plane node, existing UL tunnel information for the PDN connection, and for provisioning, at the user plane node, the updated UL tunnel information for the PDU session. In some further implementations, the control plane node of the 5GC may receive, from the control plane node of the EPC, a message which includes updated downlink (DL) tunnel information for the PDU session. Here, the control plane node of the 5GC may send a message which indicates another session modification request for provisioning, at the user plane node, the updated DL tunnel information for the PDU session.

On the other hand, a connected mode handover from the 5GS to the EPS can be achieved in the reverse but otherwise same or similar fashion as that described in relation to the connected mode handover from the EPS to the 5GS.

In a second aspect of the present disclosure, a method for mobility (e.g. "idle mode mobility") may be provided at the control plane node of the EPC. The mobility may be provided in relation to a PDU session that is managed, via a control signaling session, by the control plane node of 5GC of the 5GS and anchored at the user plane node for forwarding traffic associated with the UE. In the method, the control plane node of the EPC may send, to the control plane node of the 5GC via the N26 interface, a message which indicates a context request responsive to an indication of mobility of the PDU session from the 5GS to the EPS. The control plane node of the EPC may receive, from the control plane node of the 5GC via the N26 interface, a message which indicates a context response. The message which indicates the context response may include including an MM context of the UE and PDN connection information that is based on PDU session information of the PDU session, and include an EPS bearer context that is based on QoS flow information of a QoS Flow of the PDU session. The control plane node of the EPC may establish a PDN connection that corresponds to the PDU session based on the PDN connection information, including establishing an EPS bearer that corresponds to the QoS Flow based on the EPS bearer context. The establishing may be considered to be at least part of a converting or a re-creating of the PDU session into the PDN connection. The control plane node of the EPC may send, to the user plane node, a message which indicates a session modification request for session modification and management of the PDN connection, via the control signaling session, at the user plane node for forwarding the traffic associated with the UE.

In some implementations, in response to receiving the message which indicates the context request, the control plane node for the 5GC may select the PDN connection information corresponding to the PDU session information. In some implementations, this selection may include selecting an EBI of the EPS bearer that corresponds to a QFI of the QoS Flow. In some implementations, this selection may include selecting EPS bearer QoS parameters of the EPS bearer that correspond to QoS Flow parameters of the QoS Flow, and/or selecting a QCI of the EPS bearer that corresponds to a 5QI of the QoS Flow.

In some implementations, the message which indicates the context response may include a user plane node ID of the user plane node and a session ID of the control signaling session. Here, the control plane node of the EPC may send, to the user plane node associated with the user plane node ID, the message which indicates the session modification request for session modification and management of the PDN connection at the user plane node via the control signaling session associated with the session ID. In some further implementations, the message which indicates the context response may further include a control plane node ID of the control plane node of the EPC. Here, the control plane node of the EPC may send, to the user plane node associated with the user plane node ID, the message which indicates the session modification request for updating the user plane node with the control plane node ID of the control plane node of the EPC for the control signaling session.

In some implementations, the message may further include updated UL tunnel information for the PDN connection. Here, the control plane node of the EPC may send the message which indicates the session modification request for deleting, at the user plane node, existing UL tunnel information for the PDU session, and for provisioning, at the user plane node, the updated UL tunnel information for the PDN connection.

In some implementations, a computing device of the present disclosure may include one or more processors, one or more interfaces to connect in a network, and one or more memory elements for storing instructions executable on the one or more processors for operation as a control plane node of the EPC, or a control plane node of the 5GC, as described herein. In some other implementations, a computer program product may include a non-transitory computer readable medium and instructions stored on the non-transitory computer readable medium, where the instructions are executable by one or more processors of the computing device for operation as the control plane node of the EPC, or a control plane node of the 5GC, as described herein.

On the other hand, idle mode mobility from the EPS to the 5GS can be achieved in the reverse but otherwise same or similar fashion as that described in relation to the idle mode mobility from the 5GS to the EPS.

More detailed and alternative techniques and implementations are provided herein as described below.

EXAMPLE EMBODIMENTS

As described in the Background section, enterprise private network deployments based on Third Generation Partnership Project (3GPP) standards have recently been made possible with the offering of Citizens Band Radio Service (CBRS) and other bands. These enterprise private network deployments have been designed according to the same backend service core as existing cellular networks that operate according to Fourth Generation (4G)/Evolved Packet System (EPS) technology, namely, the 3GPP-defined Evolved Packet Core (EPC).

Today, efforts are being made to upgrade or migrate enterprise private 3GPP networks from 4G/EPS to Fifth Generation (5G) System (5GS) technology. 3GPP interworking between 4G/EPS and 5GS will play an important role in the deployment of 5G, which will initially rely on the EPS as its underlying system. Accordingly, suitable interworking between EPS and 5GS may be essential for the success of 5G.

To better illustrate, FIG. 1 is an illustrative representation of a 3GPP-based mobile network 100 having a 3GPP core architecture for interworking between an EPS 102 and a 5GS 104. In FIG. 1, the EPS 102 of the 3GPP-based mobile network 100 includes an Evolved Universal Terrestrial Radio Access Network (E-UTRAN) 112 and core functionality associated with an EPC. E-UTRAN 112 may be for Long-Term Evolution (LTE) based access, and may include one or more base stations such as an eNodeB (eNB). The EPC of EPS 102 may include core functionality associated with at least a Mobility Management Entity (MME) 114 and a Serving Gateway (SGW) 116. In some implementations, the EPC of EPS 102 may include a Control and User Plane Separation (CUPS) architecture, where SGW 116 is separated into a SGW Control Plane (SGW-C, or simply "SGW") and a SGW User Plane (SGW-U).

5GS 104 of 3GPP-based mobile network 100 includes a Next-Generation (NG) RAN (NG-RAN) 122 and core functionality associated with a 5GC. NG-RAN 122 is for 5G radio access, and may include one or more base stations such as a gNodeB (gNB). The 5GC of 5GS 104 may include core functionality associated with at least an Access and Mobility Management Function (AMF) 124 and a Policy Control Function (PCF). In the enterprise environment, policy control may be provided using pre-existing policy control mechanisms, and therefore a standard PCF may be excluded from use in the 3GPP-based mobile network 100.

For interworking, a Session Management Function (SMF) and a Packet Data Network (PDN) Gateway (PGW) Control Plane (PGW-C) are provided as a combined entity (i.e. an SMF+PGW-C 130), and a User Plane Function (UPF) and a PGW User Plane (PGW-U) are provided as a combined entity (i.e. a UPF+PGW-U 132).

Interfaces between the elements, functions, or modules in 3GPP-based mobile network 100, such as interfaces for S1-MME, S1-U, S11, S5, S8, Sx, N2, N3, N4, and N11, as shown, are described in relevant 3GPP specifications. For interworking, an N26 interface between MME 114 and AMF 124 has been introduced as an inter-core network (CN) interface for seamless session continuity.

A user equipment (UE) 106 may be configured for communications in 3GPP-based mobile network 100. UE 106 may be any suitable type of communication device, such as a cellular telephone, a smart phone, a tablet device, a gaming device, an Internet of Things (IoT) device, and a Machine-To-Machine (M2M) device, to name a few. In general, UE 106 may be registered with the 3GPP-based mobile network 100 and be able move from one cell to another cell, either in "connected mode" or "idle mode" operation. UE 106 may operate to communicate in either EPS 102 via E-UTRAN 112 (e.g. eNB) or 5GS 104 via NG-RAN 122 (e.g. gNB).

As depicted in FIG. 1, UE 106 has access to the network via E-UTRAN 112 of EPS 102, but subsequently needs access via NG-RAN 122 in 5GS 104. This change may be needed in response to an LTE coverage loss after relocation of UE 106, or in response to the ending of a voice call established based on "EPS fallback," etc. Accordingly, communications for UE 106 may be switched from E-UTRAN 112 of EPS 102 to NG-RAN 122 of 5GS 104.

At this time, SMF+PGW-C 130 maintains a control signalling session with the UPF+PGW-U for managing a PDN connection (or a Protocol Data Unit "PDU" session) of UE 106. The control signalling session may be a Packet Forwarding Control Protocol (PFCP) session which is maintained over the Sx/N4 interface. During a handover or mobility event, MME 114 and AMF 124 exchange GPRS Tunneling Protocol (GTP) version 2 (GTPv2) messages via the N26 interface for transferring UE's 106 context. As SMF+PGW-C 130 serves as a dedicated control plane "anchor" for the PDN connection (or the PDU session), seamless session continuity and IP address preservation are possible for UE 106 moving from one system to the other. Specific procedures for inter-system or inter radio access technology (RAT) handover between EPS and 5GS are defined in 3GPP specifications, for example, 3GPP Technical Specification (TS) 23.501, 23.502, and 23.244.

As described above in relation to FIG. 1, an enterprise network deployment may involve a 3GPP-based mobile network that supports both the EPS and the 5GS. In some cases, the enterprise may have to host and manage all of the complex 3GPP, 4G/LTE and 5G/NG-RAN radio and core network functions associated with both the EPC and the 5GC. This approach may be inefficient and overcomplicated for enterprise deployments, which may typically be much smaller than wide area, cellular network deployments.

Accordingly, it may be advantageous to provide a design having combined or integrated EPC/5GC core components and functionality for an enterprise network deployment, to provide meaningful consolidation and simplification for improved network management and operation. If the enterprise core is simplified in such a manner, however, it may require a new or modified 3GPP interworking between 5GS and EPS, and/or new or enhanced procedures for inter-system/RAT handover or mobility.

Figure 2:
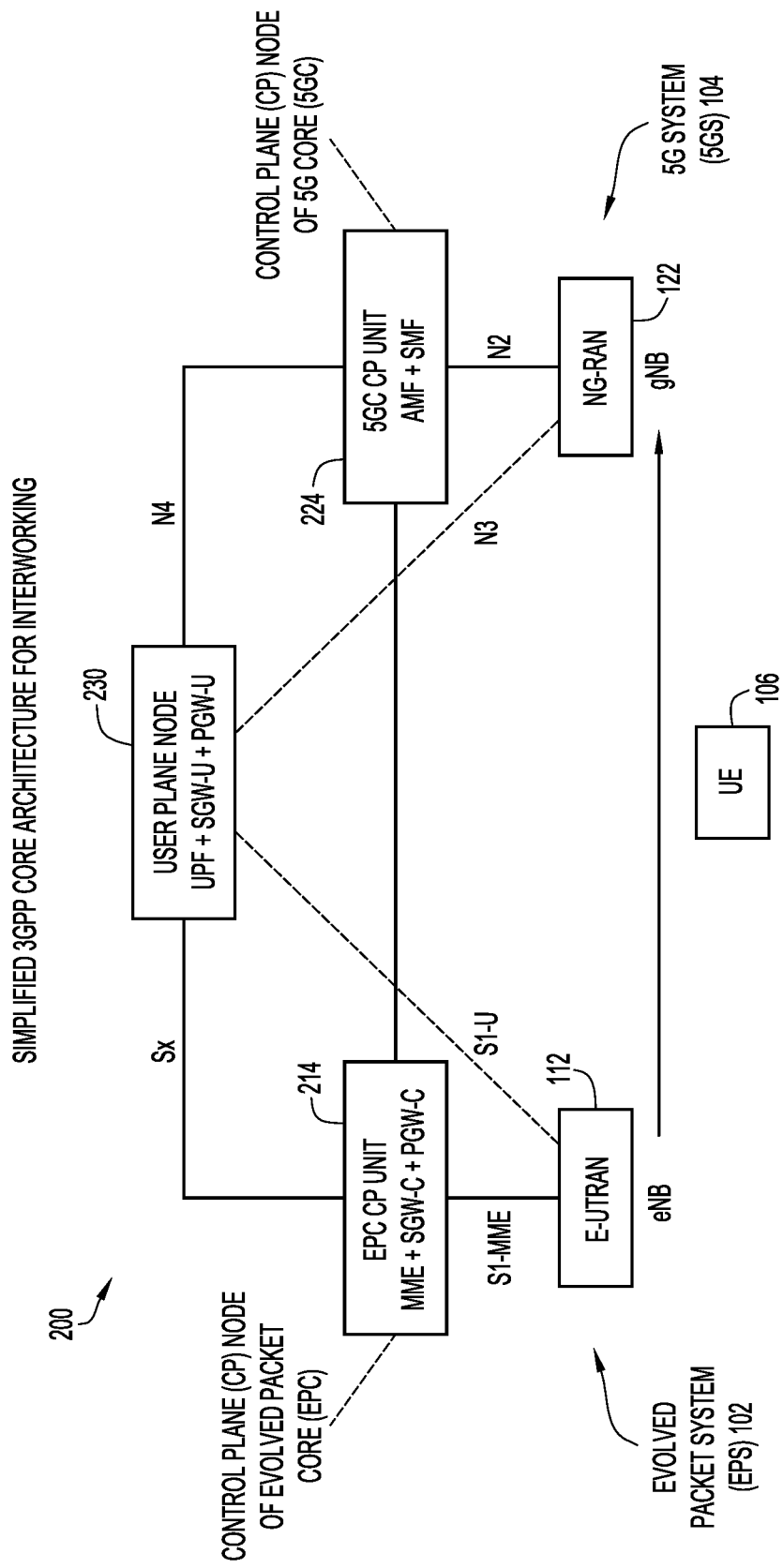
FIG. 2 is an illustrative representation of a 3GPP based mobile network having a simplified 3GPP core architecture for interworking between EPS and 5GS, suitable for use in relation to an enterprise private network.

FIG. 2 is an illustrative representation of a 3GPP based mobile network 200 having a simplified 3GPP core architecture for interworking between the EPS 102 and the 5GS 104, which is suitable for use in relation to an enterprise private network.

In general, the simplified 3GPP core architecture for interworking of FIG. 2 may include a control plane node of an EPC for the EPS 102 and a control plane node of a 5GC for the 5GS 104. The control plane node of the EPC may be considered to be or include a simplified or reduced EPC core functionality, and the control plane node of the 5GC may be considered to be or include a simplified or reduced 5GC core functionality.

In FIG. 2, the control plane node of the EPC may comprise an EPC control plane (CP) (EPC CP) unit 214, and the control plane node of the 5GC may comprise a 5GC CP unit 224. In some implementations, EPC CP unit 214 may have or contain functionality associated with a MME, an SGW-C, and a PGW-C ("MME+SGW-C+PGW-C"). In some further implementations, the functionality associated with the MME, the SGW-C, and the PGW-C may be considered to be integrated, collapsed, and/or merged into a single 4G CP box, chassis, and/or node of the EPC CP unit 214. In some further implementations, the EPC CP unit 214 is provided without (e.g. externally exposed or connected) S11, S5, and S8 interfaces.

On the other hand, 5GC CP unit 224 may have or contain functionality associated with an AMF and an SMF ("AMF+SMF"). In some further implementations, the functionality associated with the AMF and the SMF may be considered to be integrated, collapsed and/or merged into a single 5G CP box, chassis, and/or node of the 5GC CP unit 224. In some further implementations, the 5GS CP unit 224 is provided without an (e.g. externally exposed or connected) N11 interface.

At least in some implementations, EPC CP unit 214 and 5GC CP unit 224 are separate and independent units or nodes. Also, EPC CP unit 214 may exclude operation and/or (interworking) functionality associated with the 5GC CP, and 5GC CP unit 224 may exclude operation and/or (interworking) functionality associated with the EPC CP.

The simplified 3GPP core architecture of 3GPP-based mobile network 200 of FIG. 2 may further include a user plane node 230. In some implementations, user plane node 230 may have or contain functionality associated with a UPF, an SGW-U, and a PGW-U ("UPF+SGW-U+PGW-U"). In some further implementations, the functionality associated with the UPF, the SGW-U, and the PGW-U may be considered to be integrated, collapsed and/or merged into a single user plane (UP) box, chassis, and/or node of the user plane node 230.

In FIG. 2, interfaces between the elements, functions, or modules remain as shown, including interfaces for S1-MME, S1-U, Sx, N2, N3, and N4. For interworking, the EPC CP unit 214 is configured to interface with the 5GC CP unit 224 via the N26 interface.

As described previously in relation to FIG. 1, the SMF+PGW-C in the 3GPP core architecture provides a dedicated control plane anchor for the PDN connection/PDU session of a UE, such that seamless session continuity and IP address preservation are possible during an inter-system handover or mobility event. With the simplified 3GPP core architecture of FIG. 2, however, there is no dedicated control plane or SMF+PGW-C for anchoring the PDN connection/PDU session. Here, either EPC CP unit 214 maintains the control signalling session with the user plane function (i.e. the PFCP session over the Sx interface) for managing a PDN connection of UE 106, or 5GC CP unit 224 maintains the control signalling session with the user plane function (i.e. the PFCP session over the N4 interface) for managing a PDU session of UE 106. As the EPC CP and the 5GC CP are deployed in separate boxes or units, new or enhanced procedures for inter-system handover or mobility may be utilized for seamless session continuity and IP address preservation.

Accordingly, at least in some implementations, techniques and mechanisms of the present disclosure involve converting or re-creating the PDN connection/PDU session on the target control plane (i.e. the EPC CP unit 214 or the 5GC CP unit 224) for an inter-system or inter-RAT handover or mobility event. The procedure involves a change in the PFCP session endpoint. In some further implementations, techniques and mechanisms of the present disclosure involve updating the user plane function to reflect the change in the PFCP session endpoint in relation to the affected PDN connection/PDU session.

In some preferred implementations, the techniques and mechanisms of the present disclosure involve newly-defined, added or included Information Elements (IEs) in some of the GTPv2 messages exchanged on the N26 interface for connected mode handover or idle mode mobility. The newly-defined IEs may be provided in order to transfer sufficient context from the source to the target control plane node (i.e. EPC CP unit 214 to 5GC CP unit 224, or vice versa), so that the PDN connection/PDU session may be converted or re-created on the target control plane. Accordingly, the target control plane node may then update the PFCP session endpoint at the user plane function for the PDN connection/PDU session. In some implementations, enhancements to a PFCP-Session-Modification-Request may be made to include a Node ID (e.g. CP Node ID) for updating the user plane function in relation to the existing PFCP session.

Again, a UE may be registered with a 3GPP-based mobile network and be able move from one cell to another cell in either "connected mode" or "idle mode" operation. Procedures for both scenarios are described in the present disclosure. More specifically, procedures for "connected mode handover" are provided in relation to the flowchart of FIG. 3 and the call flow of FIGS. 4A-4B, and procedures for "idle mode mobility" are provided in relation to the flowchart of FIG. 5 and the call flow of FIG. 6.

Figure 3:
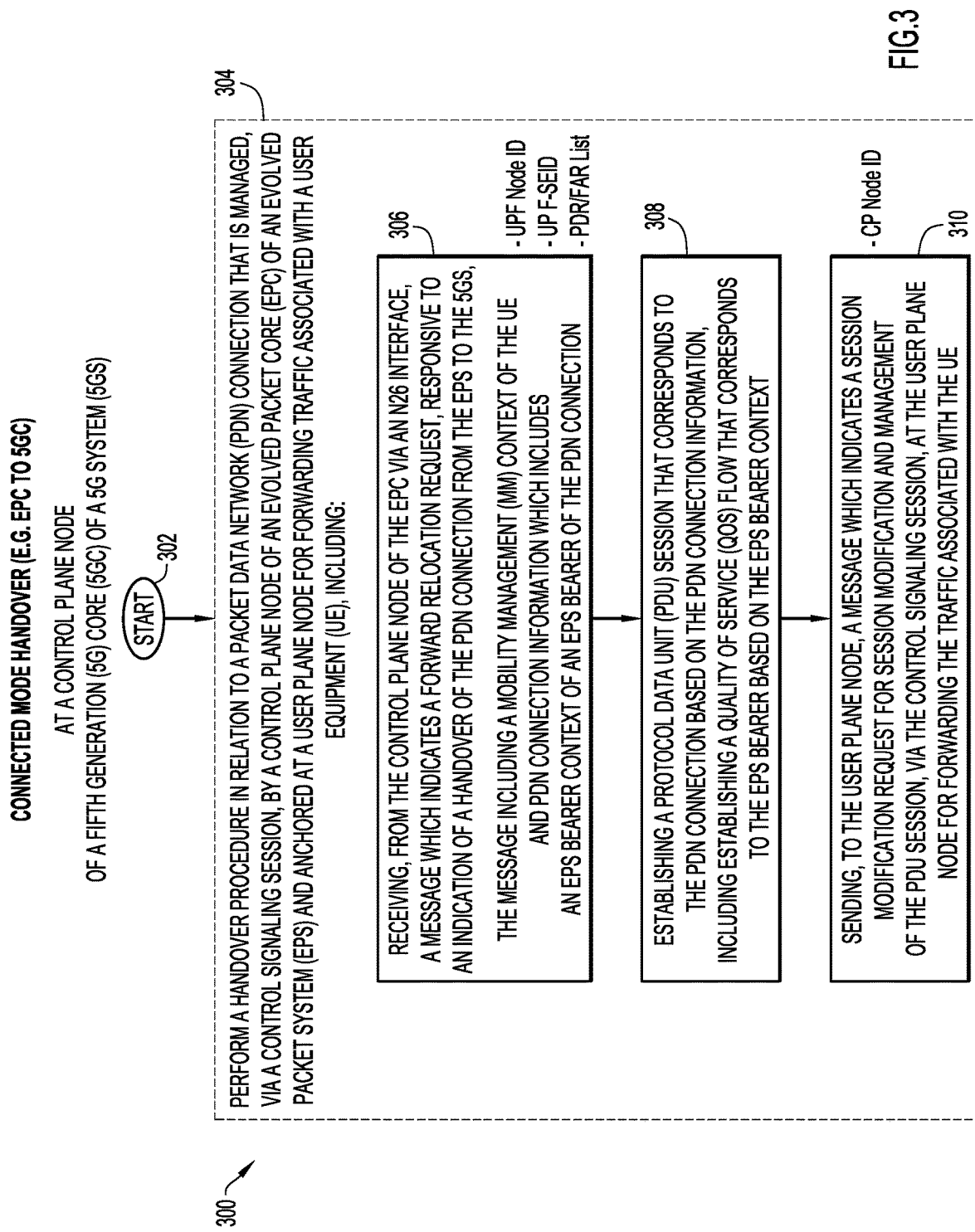
FIG. 3 is a flowchart for describing a method of performing a handover procedure ("connected mode handover") between an EPS and a 5GS using a simplified 3GPP core architecture according to some implementations of the present disclosure.

Connected Mode Handover. With reference now to FIG. 3, a flowchart 300 for describing a method for handover ("connected mode handover") between an EPS and a 5GS using a simplified 3GPP core architecture according to some implementations of the present disclosure is shown. The method may be performed by a control plane node of a 5GC, which may be part of the simplified 3GPP core architecture (see e.g. FIG. 2). In some implementations, the control plane node of the 5GC of the simplified 3GPP core architecture may be a 5GC CP unit (see e.g. 5GC CP unit 224 of FIG. 2) having functionality associated with an AMF and an SMF, without an externally exposed or connected N11 interface. For interworking, the 5GC CP unit may interface with a control plane node of an EPC which may also be part the simplified 3GPP core architecture. The control plane node of the EPC of the simplified 3GPP core architecture may be an EPC CP unit having functionality associated with a MME, SGW-C, and a PGW-C, without externally exposed or connected S11, S5, and S8 interfaces. The method may be embodied in a computer program product which includes a non-transitory computer readable medium and instructions stored in the non-transitory computer readable medium, where the instructions are executable by one or more processors of the control plane node of the 5GC.

Beginning at a start block 302 of FIG. 3, the control plane node of the 5GC may operate to perform a handover procedure in relation to a PDN connection that is managed, via a control signaling session, by the control plane node of the EPC and anchored at a user plane node for forwarding traffic associated with a UE (step 304 of FIG. 3). In the procedure, the control plane node of the 5GC may receive, from the control plane node of the EPC via the N26 interface, a message which indicates a forward relocation request responsive to an indication of a handover of the PDN connection from the EPS to the 5GS (step 306 of FIG. 3). The message may include Mobility Management (MM) context information of the UE. The message may further include PDN connection information which includes an EPS bearer context of an EPS bearer of the PDN connection. The control plane node of the 5GC may establish a PDU session that corresponds to the PDN connection based on the PDN connection information (step 308 of FIG. 3). The establishing of the PDU session may include establishing a Quality of Service (QoS) Flow that corresponds to the EPS bearer based on the EPS bearer context. The establishing in step 308 may be considered to be at least part of a converting or a re-creating of the PDN connection into the PDU session. The MM context of the UE may also be converted as needed. The control plane node of the 5GC may send, to the user plane node, a message which indicates a session modification request for session modification and management of the PDU session, via the control signaling session, at the user plane node for forwarding the traffic associated with the UE (step 310 of FIG. 3).

In some implementations, in step 308, the control plane node of the 5GC may establish the QoS Flow by generating or selecting a QoS Flow Identifier (QFI) of the QoS Flow that corresponds to an EPS Bearer ID (EBI) of the EPS bearer. In some further implementations, in step 308, the control plane node of the 5GC may establish the QoS Flow by generating or selecting a 5G QoS Identifier (5QI) of the QoS Flow that corresponds to a QoS Class Identifier (QCI) of the EPS bearer, and/or by generating or selecting QoS Flow parameters of the QoS Flow that correspond to EPS bearer QoS parameters of the EPS bearer.

In some implementations, in step 306, the message which indicates the forward relocation request may include a user plane node ID of the user plane node and a session ID of the control signaling session. Here, the control plane node of the 5GC may use this information in step 310 to send, to the user plane node associated with the user plane node ID, the message which indicates the session modification request for session modification and management of the PDU session at the user plane node via the control signaling session associated with the session ID.

In some further implementations, in step 310, the message which indicates the session modification request may further include a control plane node ID of the control plane node of the 5GC. Here, the control plane node of the 5GC may use this information to send, to the user plane node associated with the user plane node ID, the message which indicates the session modification request for updating the user plane node with the control plane node ID of the control plane node of the 5GC for the control signaling session.

In some implementations, in step 306, the message may further include updated uplink (UL) tunnel information for the PDU session. Here, the control plane node of the 5GC may use this information in step 310 to send the message which indicates the session modification request for deleting, at the user plane node, existing tunnel information for the PDN connection, and for provisioning, at the user plane node, the updated UL tunnel information for the PDU session. In some further implementations, the control plane node of the 5GC may receive, from the control plane node of the EPC, a message which includes updated downlink (DL) tunnel information for the PDU session. Here, the control plane node of the 5GC may send an additional message which indicates another session modification request for provisioning, at the user plane node, the updated DL tunnel information for the PDU session.

Again, as described above, the procedures for inter-system handover or mobility may involve converting or re-creating the PDN connection/PDU session on the target control plane, which may involve a change in the PFCP session endpoint. Also, the procedures may involve updating the user plane node to reflect the change in the PFCP session endpoint in relation to the affected the PDN connection/PDU session. To achieve this, the procedures may involve newly-defined IEs in some of the GTPv2 messages exchanged on the N26 interface (e.g. a forward relocation request, and a context response) in order to transfer sufficient context from the source to the target control plane node. Then, the target control plane node may update the PFCP session endpoint at the user plane node for the PDN connection/PDU session. In some implementations, enhancements to the PFCP-Session-Modification-Request may be made to include a Node ID for updating the user plane node in relation to the existing PFCP session.

More specifically, in the case of "connected mode handover," a GTPv2 message indicating a forward relocation request is sent from the source to the target control plane node in order to transfer the UE's MM context and PDN connection information. In some implementations, it is proposed to add the following fields in the "PDN Connection" IE of the GTPv2 message which indicates the forward relocation request (e.g. step 306 of FIG. 3):

UPF Node ID—this is of type "Node ID" given in 3GPP TS 29.244;

UP Fully-qualified Session ID (F-SEID)—this is of type "F-SEID" given in 3GPP TS 29.244; and Packet Detection Rule (PDR)/Forwarding Action Rule (FAR) List, for each source interface (e.g. core, access, etc. as described in 3GPP 29.244), associated with the updated tunnel information.

The above IEs may be used by the new control plane node for managing/provisioning the user plane node in relation to the re-created PDN connection/PDU session of the UE.

In some further implementations, it is proposed to add the following IE in the PFCP message which indicates the session modification request (e.g. step 310 of FIG. 3):

CP Node ID—this is of type "Node ID" given in 3GPP 29.244.

The above IE may be used by the new control plane node to update the CP Node ID in the user plane node. On receiving this IE, the user plane node may update the same in its session context that is maintained locally.

Figure 4A:
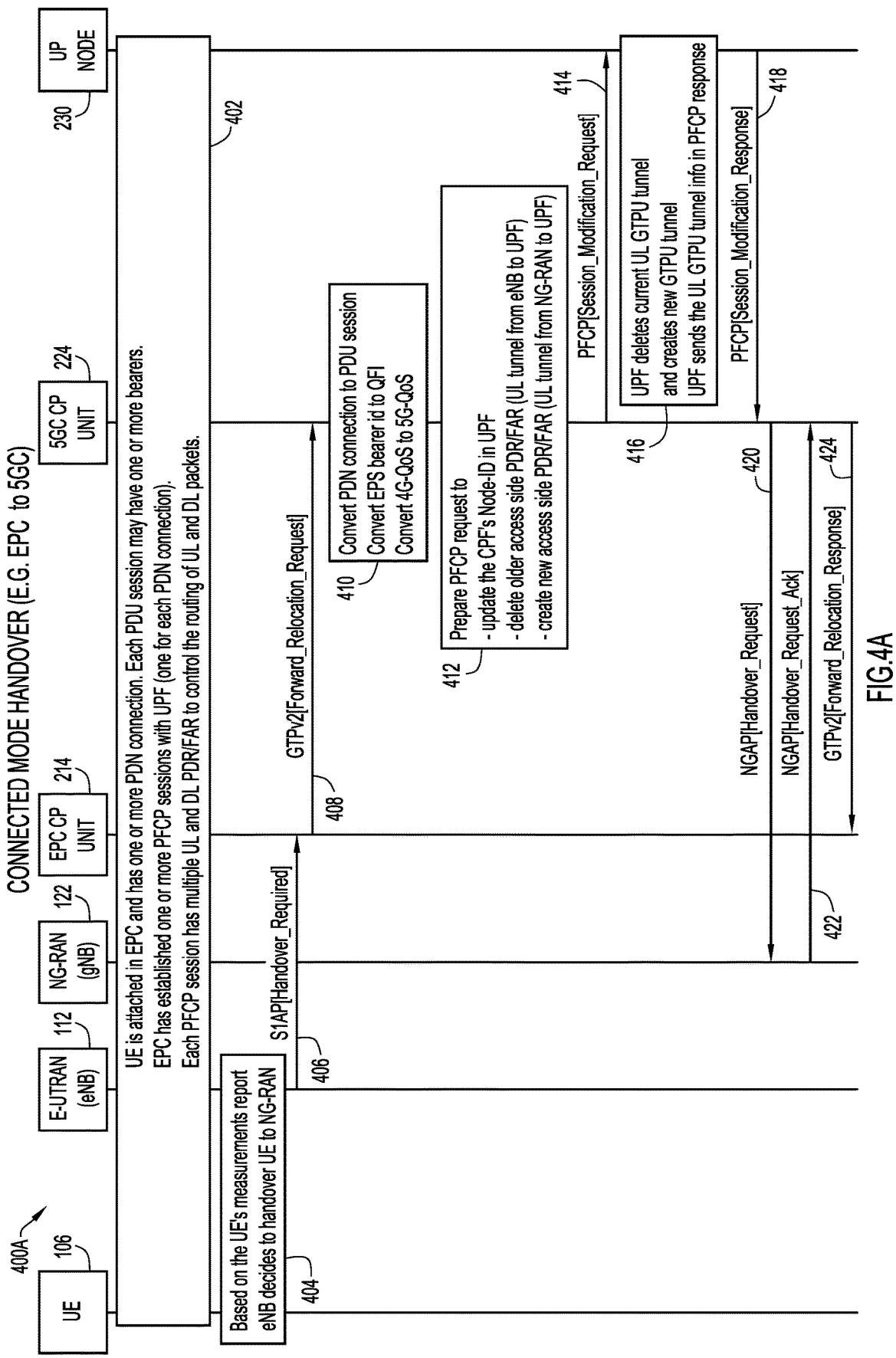
FIGS. 4A-4B form a call flow diagram for describing a call flow for performing a handover procedure ("connected mode handover") between an EPS and a 5GS using a simplified 3GPP core architecture according to some implementations of the present disclosure.
Figure 4B:
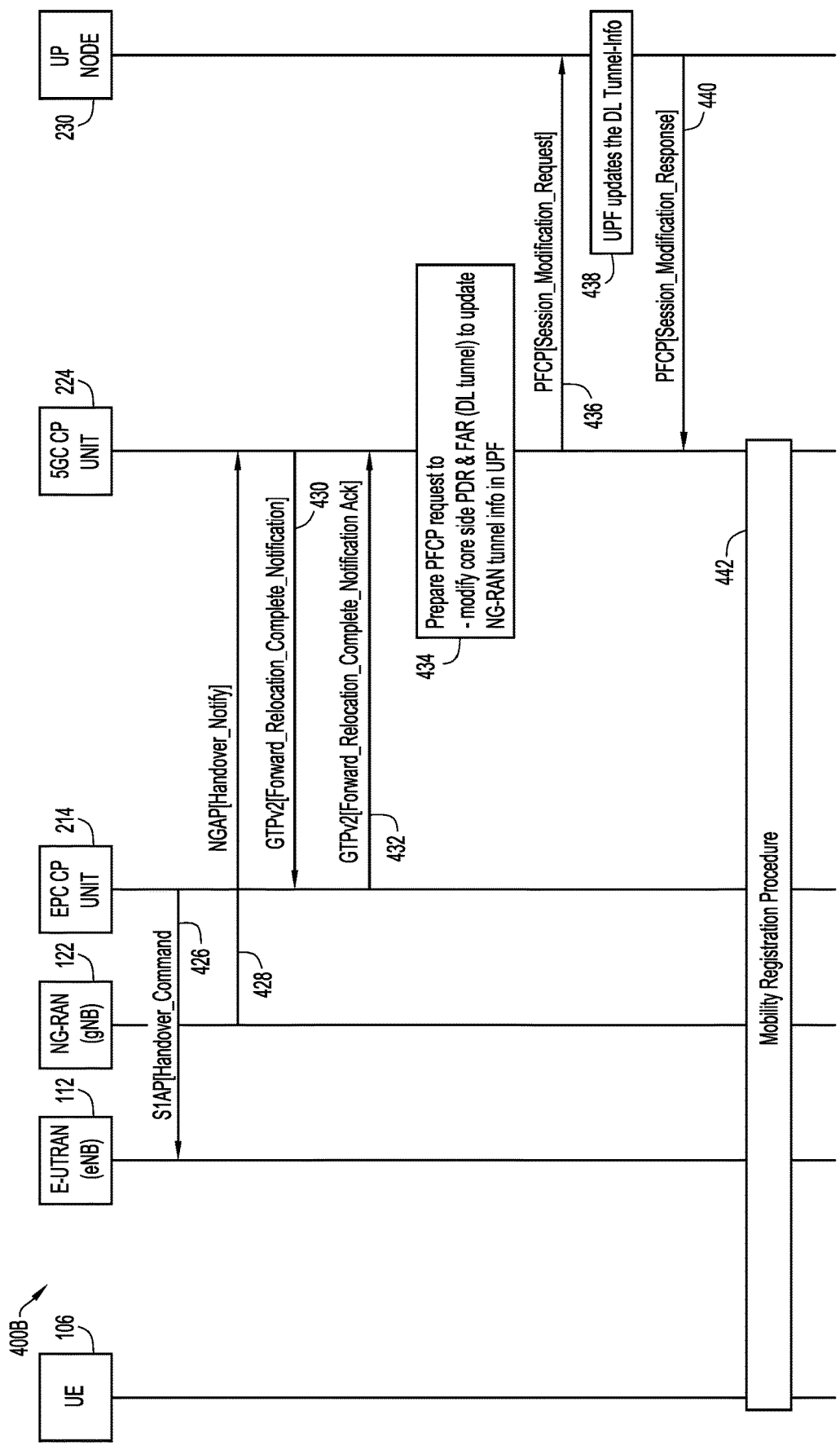

FIGS. 4A-4B form a call flow diagram 400A-400B for describing a call flow for performing a handover procedure ("connected mode handover") between an EPS and a 5GS using a simplified 3GPP core architecture according to some implementations of the present disclosure. The call flow of FIGS. 4A-4B may be considered to be a further description of the method described above in relation to the 5GC CP unit (e.g. the method of FIG. 3), and make use of the new IEs/fields as described above.

Beginning at a start step 402 of call flow diagram 400A of FIG. 4A, UE 106 operates in CONNECTED mode and is attached to the EPC with one or more PDN connections that are established (step 402 of FIG. 4A). Each PDN connection may be associated with one or more EPS bearers, where each EPS bearer is associated with an EPS bearer, context, an EBI, a QCI, and EPS bearer QoS parameters. EPC CP unit 214 has one or more PFCP sessions with the user plane node, one for each PDN connection of UE 106. Each PFCP session may be associated with an F-SEID. Each PFCP session has multiple UL and DL PDRs/FARs to control the routing of UL and DL packets.

In CONNECTED mode operation, UE 106 performs measurement operations and reports these measurements to E-UTRAN 112, which proceeds to determine that a handover should be initiated for UE 106 (step 404 of FIG. 4A). Here, E-UTRAN 112 sends an S1 Application Protocol (S1AP) message which includes a handover request to EPC CP unit 214 (step 406 of FIG. 4A). In response, EPC CP unit 214 sends a GTPv2 message which indicates a forward relocation request to 5GC CP unit 224 over the N26 interface (step 408 of FIG. 4A). The message may include an MM context of UE 106 and PDN connection information associated with the PDN connection. The message may further include the IEs associated with the UPF Node ID of the user plane node and the UP F-SEID of the PFCP session. The message may even further include the IEs for the PDR/FAR list, associated with the updated tunnel information.

5GC CP unit 224 receives the message which indicates the forward relocation request, including the MM context of UE 106, the PDN connection information, and the new IEs. In response to receiving the message, the 5GC CP unit 224 establishes a PDU session that corresponds to the PDN connection based on the PDN connection information (step 410 of FIG. 4A), which includes establishing a QoS Flow that corresponds to the EPS bearer based on the EPS bearer context. PDU session information for the PDU session may be generated or selected based on the PDN connection information for the PDN connection. Data or parameters that may be generated or selected for the conversion may include one or more of the following: an PDU session ID that corresponds to a PDN connection ID of the PDN connection; a PDU type of PDU session that corresponds to a PDN type of the PDN connection; a QFI of the QoS Flow that corresponds to the EBI associated with the EPS bearer; QoS Flow parameters of the QoS Flow that correspond to the EPS bearer QoS parameters associated with the EPS bearer; and a 5QI of the QoS Flow that corresponds to the QCI of the EPS bearer. In some implementations, the above processing may utilize stored mappings, such as 5QI-to-QCI mappings. The MM context of UE 106 may also be converted as needed.

5GC CP unit 224 will perform session modification and management of the PDU session at user plane node 230 via the PFCP session. To perform this task, 5GC CP unit 224 will prepare a session modification request to send to user plane node 230 (step 412 of FIG. 4A). 5GC CP unit 224 has already obtained the UPF Node ID of user plane node 20 and the UP F-SEID for identification of the PFCP session. The session modification request may be prepared to include an indication to update the CP Node ID of 5GC CP unit 224 at user plane node 230. The session modification request may be further prepared to include an indication to delete the old PDR/FAR associated with the access side, the old UL tunnel from E-UTRAN 112 to user plane node 230. The session modification request may be further prepared to include an indication to create the new PDR/FAR associated with the access side, the new UL tunnel from NG-RAN 122 to user plane node 230.

Once the session modification request is prepared, 5GC CP unit 224 will send to user plane node 230 the message which indicates the session modification request (step 414 of FIG. 4A). User plane node 230 may receive and process the message which indicates the session modification request (step 416 of FIG. 4A). Here, user plane node 230 may update the CP Node ID of 5GC CP unit 224 for the PFCP session. User plane node 230 may delete the old PDR/FAR associated with the access side, the old UL tunnel from E-UTRAN 112 to user plane node 230. User plane node 230 may create the new PDR/FAR associated with the access side, the new bearer UL tunnel (i.e. GTP-U tunnel) from NG-RAN 122 to user plane node 230. After such processing, user plane node 230 may send to 5GC CP unit 224 a message which indicates a session modification response (step 418 of FIG. 4A).

5GC CP unit 224 will receive the message which indicates the session modification response. In response to receiving the message, 5GC CP unit 224 may send to NG-RAN 122 an NG Application Protocol (NGAP) message which includes a handover request (step 420 of FIG. 4A). NG-RAN 122 will process the message and send back to 5GC CP unit 224 an NGAP message which includes a handover response (step 422 of FIG. 4A). 5GC CP unit 224 will send a GTPv2 message which indicates a forward relocation response to EPC CP unit 214 over the N26 interface (step 424 of FIG. 4A), which is responsive to the forward relocation request received previously in relation to step 408.

The call flow continues to FIG. 4B with call flow diagram 400B. After receiving the GTPv2 message which indicates the forward relocation response from 5GC CP unit 224 over the N26 interface, EPC CP unit 214 may send an S1AP message which includes a handover command to E-UTRAN 112 (step 426 of FIG. 4B). 5GC CP unit 224 then receives from NG-RAN 122 an NGAP message which includes a handover notify (step 428 of FIG. 4B). In response to receiving the NGAP message, 5GC CP unit 224 sends to EPC CP unit 214, over the N26 interface, a GTPv2 message which indicates a forward relocation complete notification (step 430 of FIG. 4B). EPC CP unit 214 receives the GTPv2 message and sends back to 5GC CP unit 224, over the N26 interface, a GTPv2 message which indicates a forward relocation complete notification acknowledgement (step 432 of FIG. 4B).

Accordingly, once UE 106 has moved to the target RAT (i.e. NG-RAN 122) and 5GC CP unit 224 has the DL tunnel information, 5GC CP unit 224 may prepare and another session modification request to user plane node 230. The session modification request may be prepared to include an indication to modify the PDR/FAR associated with the core side, with the new DL, NG-RAN tunnel information in user plane node 230 (step 434 of FIG. 4B). 5GC CP unit 224 may then send to user plane node 230 the message which indicates the session modification request (step 436 of FIG. 4B). User plane node 230 may receive the message which indicates the session modification request, and update the DL tunnel information for the PDU session (step 438 of FIG. 4B). After such processing, user plane node 230 may send to 5GC CP unit 224 a message which indicates a session modification response (step 440 of FIG. 4B). After these steps, 5GC CP unit 224 may participate in a registration procedure with UE 106 (step 442 of FIG. 4B), where UE 106 operates in the 5GS. The call flow for the EPC to 5GC connected mode handover is completed.

Note that a 5GC to EPC connected mode handover can be achieved in the reverse but otherwise same or similar fashion as that described in relation to FIG. 3 and/or FIGS. 4A-4B. For example, operations may be performed at the control plane node of the EPC, which involve receiving, from the control plane node of the 5GC via the N26 interface, a message which indicates a subsequent forward relocation request responsive to an indication of a subsequent handover of the PDU session from the 5GS to the EPS, where the message includes the MM context of the UE and PDU session information which includes QoS Flow information of the QoS Flow of the PDU session; establishing a subsequent PDN connection that corresponds to the PDU session based on the PDU session information, including establishing a subsequent EPS bearer that corresponds to the QoS Flow based on the QoS Flow information; and sending, to the user plane node, a message which indicates a subsequent session modification request for session modification and management of the subsequent PDN connection, via the control signaling session, at the user plane node for forwarding the traffic associated with the UE.

Figure 5:
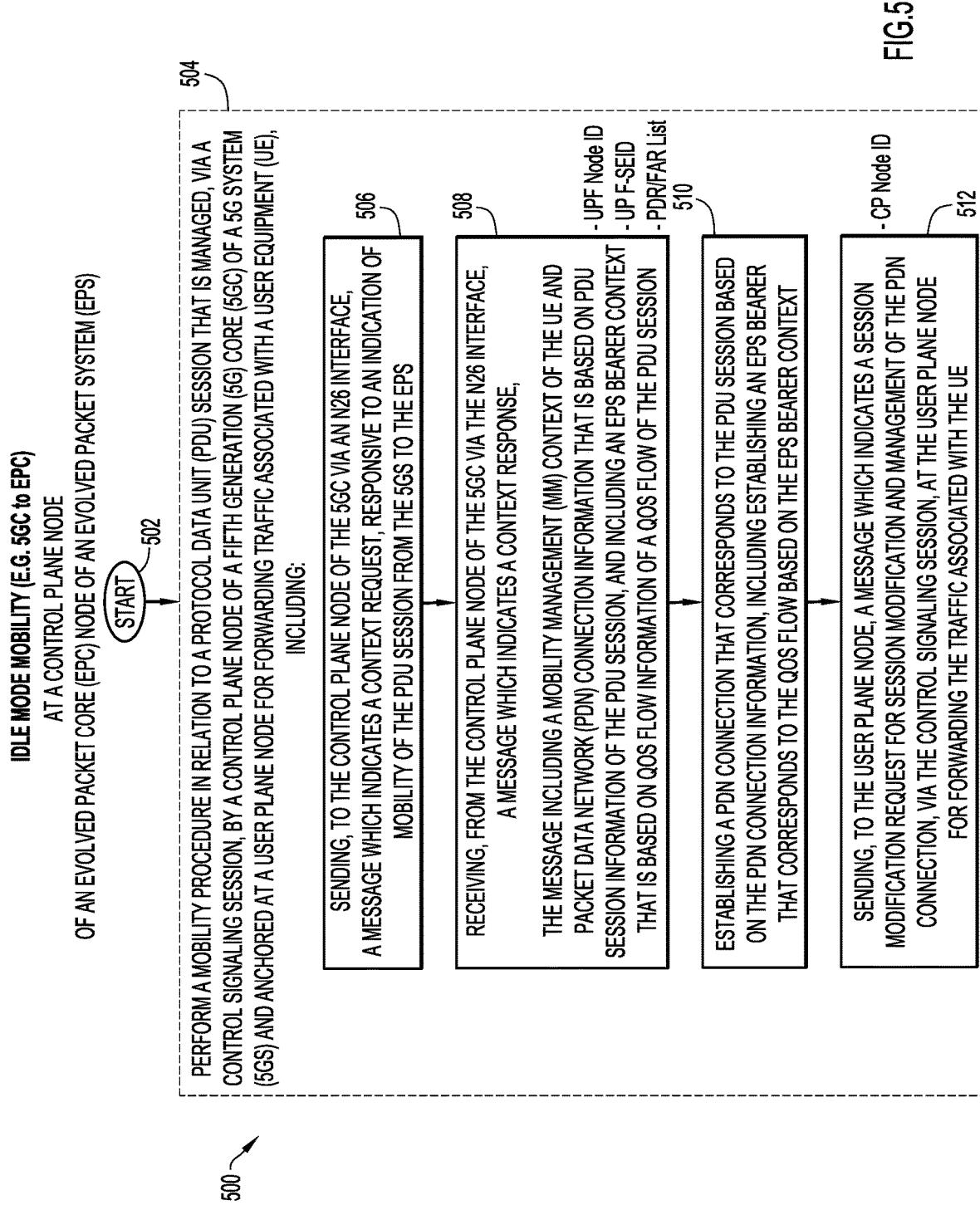
FIG. 5 is a flowchart for describing a method of performing a mobility procedure ("idle mode mobility") between a 5GS and an EPS using a simplified 3GPP core architecture according to some implementations of the present disclosure.

Idle Mode Mobility. With reference now to FIG. 5, a flowchart 500 for describing a method for mobility ("idle mode mobility") between a 5GS and an EPS using a simplified 3GPP core architecture according to some implementations of the present disclosure is shown. The method may be performed by a control plane node of an EPC, which may be part of the simplified 3GPP core architecture. In some implementations, the control plane node of the EPC of the simplified 3GPP core architecture may be an EPC CP unit (see e.g. EPC CP unit 214 of FIG. 2) having functionality associated with a MME, a SGW-C, and a PGW-C, without externally exposed or connected S11, S5, and S8 interfaces. For interworking, the EPC CP unit may interface with a control plane node of an 5GC which may also be part the simplified 3GPP core architecture. The control plane node of the 5GC of the simplified 3GPP core architecture may be a 5GC CP unit having functionality associated with an AMF and an SMF, without an externally exposed or connected N11 interface. The method may be embodied in a computer program product which includes a non-transitory computer readable medium and instructions stored in the non-transitory computer readable medium, where the instructions are executable by one or more processors of the control plane node of the EPC.

Beginning at a start block 502 of FIG. 5, the control plane node of the EPC may operate to perform mobility in relation to a PDU session that is managed, via a control signaling session, by the control plane node of the 5GC and anchored at a user plane node for forwarding traffic associated with a UE (step 504 of FIG. 5). In the procedure, the control plane node of the EPC may send, to the control plane node of the 5GC via the N26 interface, a message which indicates a context request responsive to an indication of mobility of the PDU session from the 5GS to the EPS (step 506 of FIG. 5). The control plane node of the EPC may receive, from the control plane node of the 5GC via the N26 interface, a message which indicates a context response (step 508 of FIG. 5). The message which indicates the context response may include MM context information of the UE. The message which indicates the context response may further include PDN connection information that is based on PDU session information of the PDU session, and include an EPS bearer context that is based on QoS flow information of a QoS Flow of the PDU session. The control plane node of the EPC may establish a PDN connection that corresponds to the PDU session based on the PDN connection information, including establishing an EPS bearer that corresponds to the QoS Flow based on the EPS bearer context (step 510 of FIG. 5). This establishing may be considered to be at least part of a converting or a re-creating of the PDU session into the PDN connection. The control plane node of the EPC may send, to the user plane node, a message which indicates a session modification request for session modification and management of the PDN connection, via the control signaling session, at the user plane node for forwarding the traffic associated with the UE (step 512 of FIG. 5).

In some implementations, in response to receiving the message which indicates the context request in step 506, the control plane node for the 5GC may generate or select the PDN connection information that corresponds to the PDU session information. This generation or selection may be at least part of a converting or a re-creating of the PDU session into the PDN connection. The MM context of the UE may also be converted as needed. In some implementations, the generating or selecting may include generating or selecting an EBI of the EPS bearer that corresponds to a QFI of the QoS Flow. In some implementations, this generating or selecting may include generating or selecting EPS bearer QoS parameters of the EPS bearer that correspond to QoS Flow parameters of the QoS Flow, and/or generating or selecting a QCI of the EPS bearer that corresponds to a 5QI of the QoS Flow.

In some implementations, in step 508, the message which indicates the context response may include a user plane node ID of the user plane node and a session ID of the control signaling session. Here, the control plane node of the EPC may use this information in step 512 to send, to the user plane node associated with the user plane node ID, the message which indicates the session modification request for session modification and management of the PDN connection at the user plane node via the control signaling session associated with the session ID.

In some further implementations, in step 512, the message which indicates the session modification request may further include a control plane node ID of the control plane node of the EPC. Here, the control plane node of the EPC may use this information to send, to the user plane node associated with the user plane node ID, the message which indicates the session modification request for updating the user plane node with the control plane node ID of the control plane node of the EPC for the control signaling session.

In some implementations, in step 508, the message may further include updated UL tunnel information for the PDN connection. Here, the control plane node of the EPC may use this information in step 512 to send the message which indicates the session modification request for deleting, at the user plane node, existing tunnel information for the PDU session, and for provisioning, at the user plane node, the updated UL tunnel information for the PDN connection.

More specifically, in the case of "idle mode mobility," a GTPv2 message indicating a context response is sent from the source to the target control plane node in order to transfer the UE's MM context and PDN connection information. In some specific implementations, it is proposed to add the following fields in the "PDN Connection" IE of the GTPv2 message which indicates the context response (e.g. step 508 of FIG. 5):

UPF Node ID—this is of type "Node ID" given in 3GPP TS 29.244;
UP F-SEID—this is of type "F-SEID" given in 3GPP TS 29.244; and
PDR/FAR List, for each source interface (e.g. core, access, etc. as described in 3GPP 29.244), associated with the updated tunnel information.

The above IEs may be used by the new control plane node for managing/provisioning the user plane node in relation to the re-created PDN connection/PDU session of the UE.

In some further implementations, it is proposed to add the following IE in the PFCP message which indicates the session modification request (e.g. step 512 of FIG. 5):

CP Node ID—this is of type "Node ID" given in 3GPP 29.244.

The above IE may be used by the new control plane node to update the CP Node ID in the user plane node (e.g. the UPF). On receiving this IE, the user plane node may update the same in its session context that is maintained locally.

Figure 6:
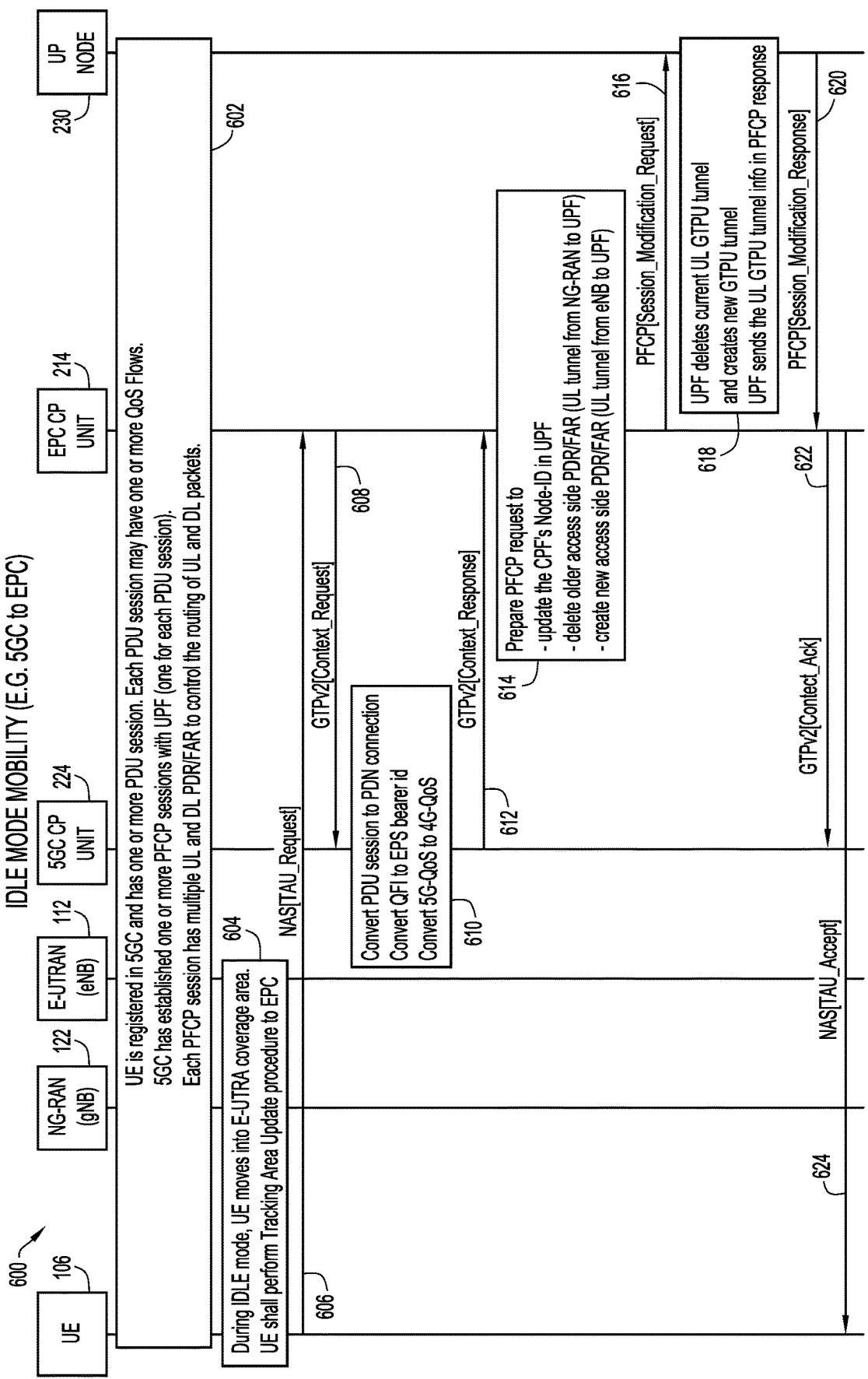
FIG. 6 is a call flow diagram for describing a call flow for performing a mobility procedure ("idle mode mobility") between a 5GS and an EPS using a simplified 3GPP core architecture according to some implementations of the present disclosure.

FIG. 6 is a call flow diagram 600 for describing a call flow for performing a mobility procedure ("idle mode mobility") between a 5GS and an EPS using a simplified 3GPP core architecture according to some implementations of the present disclosure. The call flow of FIG. 6 may be considered to be a further description of the method described above in relation to the EPC CP unit (e.g. the method of FIG. 5), and make use of the new IEs/fields as described above.

Beginning with the call flow diagram 600 of FIG. 6, UE 106 operates in IDLE mode and is registered in the 5GC with one or more PDU sessions that are established (step 602 of FIG. 6). Each PDU session may be associated with one or more QoS Flows, where each QoS Flow is associated with a QFI, a 5QI, and QoS Flow parameters. The 5GC CP unit 224 has one or more PFCP sessions with the user plane node, one for each PDU session of UE 106. Each PFCP session may be associated with an F-SEID. Each PFCP session has multiple UL and DL PDRs/FARs to control the routing of UL and DL packets.

In IDLE mode operation, UE 106 is relocated into a E-UTRAN area and will perform a Tracking Area Update (TAU) procedure with EPC CP unit 214 (step 604 of FIG. 6). Here, UE 106 will send a Non-Access Stratum (NAS) message which includes a TAU request for receipt by EPC CP unit 214 (step 606 of FIG. 6). In response, EPC CP unit 214 will send a GTPv2 message which indicates a context request to 5GC CP unit 224 over the N26 interface (step 608 of FIG. 6). The 5GC CP unit 224 will receive the message which indicates the context request.

In response to receiving the message, the 5GC CP unit 224 will initiate a conversion of the PDU session into a PDN connection having one or more EPS bearers (step 610 of FIG. 6). PDN connection information for the PDN connection may be generated or selected based on existing PDU session information for the PDU session. Data or parameters that may be generated or selected for the conversion may include one or more of the following: an PDN connection ID that corresponds to a PDU session ID of the PDU session; a PDN type of PDN connection that corresponds to a PDU type of the PDU session; an EBI associated with an EPS bearer that corresponds to the QFI of the QoS Flow; EPS bearer QoS parameters associated with the EPS bearer that corresponds to the QoS Flow parameters of the QoS Flow; and a QCI of the EPS bearer that corresponds to the 5QI of the QoS Flow. In some implementations, the above processing may utilize stored mappings, such as QCI-to-5QI mappings.

After generation or selection of the PDN connection information, 5GC CP unit 224 may send a GTPv2 message which indicates a context response to the EPC CP unit 214 over the N26 interface (step 612 of FIG. 6). The message may include the MM context of UE 106 and the PDN connection information for the PDN connection. The message may further include the IEs associated with the UPF Node ID of the user plane node and the UP F-SEID of the PFCP session. The message may even further include the IEs for the PDR/FAR list, associated with the updated tunnel information.

EPC CP unit 214 will receive the message which indicates the context response, including the MM context of UE 106, the PDN connection information, and the new IEs. In response to receiving the message, EPC CP unit 214 will generally establish the PDN connection that corresponds to the PDU session based on the PDN connection information, including establishing the EPS bearer that corresponds to the QoS Flow based on the EPS bearer context. Here, EPC CP unit 214 will perform session modification and management of the PDN connection at user plane node 230 via the PFCP session.

More particularly, EPC CP unit 214 will prepare a session modification request to send to user plane node 230 (step 614 of FIG. 6). EPC CP unit 214 has obtained the UPF Node ID of user plane node 230 and the UP F-SEID for identification of the PFCP session. The session modification request may be prepared to include an indication to update the CP Node ID of EPC CP unit 214 at user plane node 230. The session modification request may be further prepared to include an indication to delete the old PDR/FAR associated with the access side, the old UL tunnel from NG-RAN 122 to user plane node 230. The session modification request may be further prepared to include an indication to create the new PDR/FAR associated with the access side, the new UL tunnel (i.e. GTP-U tunnel) from E-UTRAN 112 to user plane node 230.

Once the session modification is prepared, EPC CP unit 214 will send to user plane node 230 the message which indicates the session modification request (step 616 of FIG. 6). User plane node 230 may receive and process the message which indicates the session modification request (step 618 of FIG. 6). In response to receiving the message, user plane node 230 may update the CP Node ID of EPC CP unit 214 for the PFCP session. User plane node 230 may delete the old PDR/FAR associated with the access side, the old UL tunnel from NG-RAN 122 to user plane node 230. User plane node 230 may create the new PDR/FAR associated with the access side, the new bearer UL tunnel from E-UTRAN 112 to user plane node 230.

After this processing, user plane node 230 may send to EPC CP unit 214 a message which indicates a session modification response (step 620 of FIG. 6). Subsequently, EPC CP unit 214 may send a GTPv2 message which indicates a context acknowledgement to 5GC CP unit 224 (step 622 of FIG. 6). EPC CP unit 214 will subsequently complete the TAU procedure by sending a NAS message which includes a TAU accept for receipt by UE 106 (step 624 of FIG. 6). The call flow for the 5GC to EPC idle mode mobility is completed.

Note that EPC to 5GC idle mode mobility can be achieved in the reverse but otherwise same or similar fashion as that described in relation to FIG. 5 and/or FIG. 6. For example, operations may be performed at the control plane node of the 5GC, which involve sending, to the control plane node of the EPC via the N26 interface, a message which indicates a subsequent context request responsive to an indication of subsequent mobility of the PDN connection from the EPS to the 5GS; receiving, from the control plane node of the EPC via the N26 interface, a message which indicates a subsequent context response, the message including the MM context of the UE and subsequent PDU session information that is based on the PDN connection information of the PDN connection, and including subsequent QoS flow information that is based on the EPS bearer context of the EPS bearer of the PDN connection; establishing a subsequent PDU session that corresponds to the PDN connection based on the subsequent PDU session information, including establishing a subsequent QoS Flow that corresponds to the EPS bearer based on the subsequent QoS flow information; and sending, to the user plane node, a message which indicates a subsequent session modification request for session modification and management of the subsequent PDU session, via the control signaling session, at the user plane node for forwarding the traffic associated with the UE.

Thus, as described herein, the new or target control plane node is able to create a PDU session/PDN connection using information received from the old or source control plane node, which may provide for IP continuity for inter-system handover and mobility. This is desirable because, unlike the standard 3GPP architecture, there may be no dedicated anchor PGW-C+UPF in the simplified 3GPP core architecture. Even further, the existing PFCP session between the old or source control plane node and the user plane node may be migrated to the new or target control plane node, which may provide for service continuity for inter-system handover and mobility.

Figure 7:
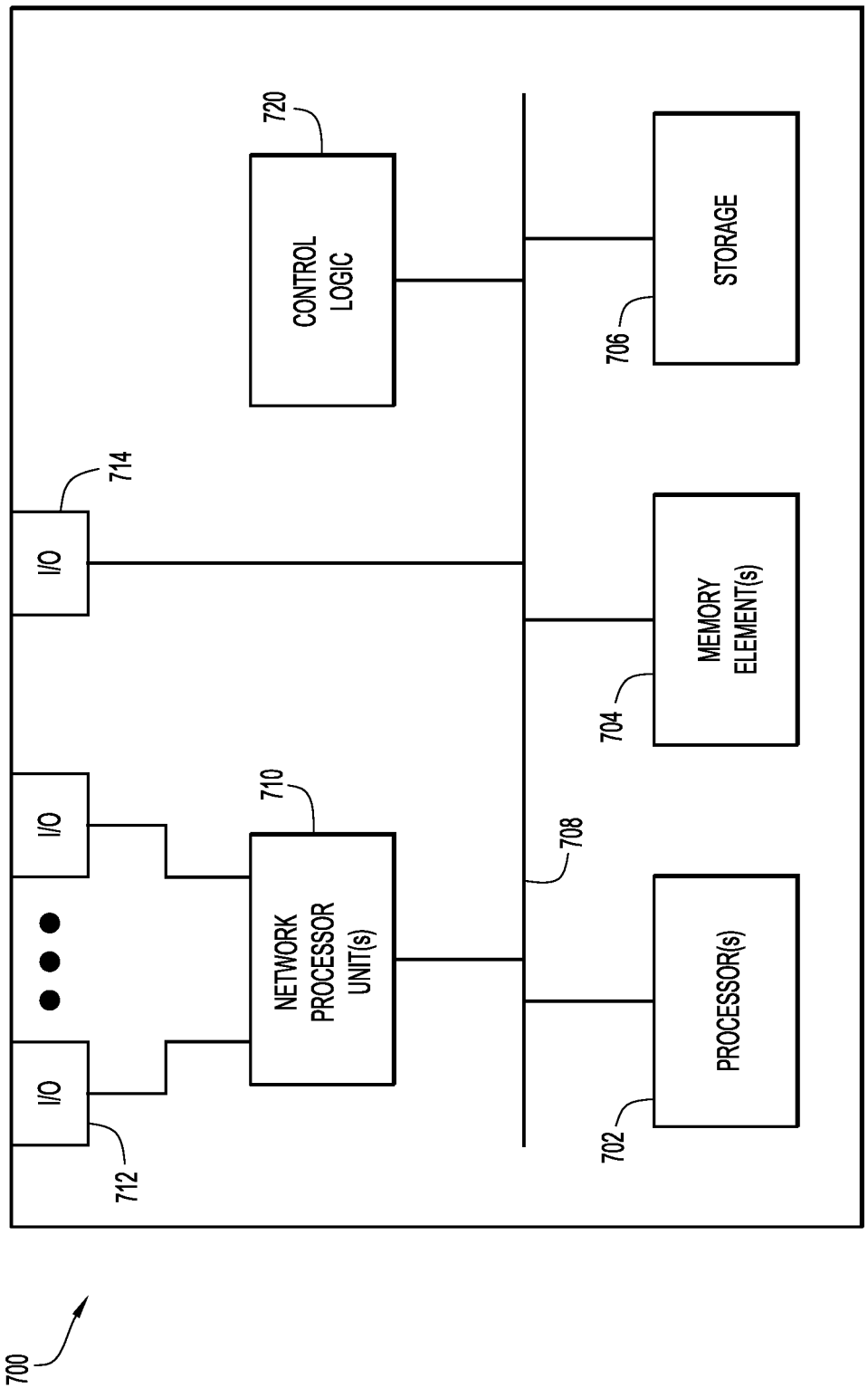
FIG. 7 illustrates a hardware block diagram of a computing device that may perform functions associated with operations of the control plane node of the 5GC, or the control plane node of the EPC, according to some implementations of the present disclosure.

FIG. 7 illustrates a hardware block diagram of a computing device 700 that may perform functions associated with operations discussed herein in connection with the techniques described in relation to the above figures. In various embodiments, a computing device, such as computing device 700 or any combination of computing devices 700, may be configured as any entity/entities as discussed for the techniques depicted in connection with the figures in order to perform operations of the various techniques discussed herein. In particular, computing device 700 may perform operations of EPC CP unit 214 of FIG. 2 for operation in accordance with FIGS. 3 and 4A-4B, or may perform operations of 5GC CP unit 224 of FIG. 2 for operation in accordance with FIGS. 5 and 6.

In at least one embodiment, computing device 700 may include one or more processor(s) 702, one or more memory element(s) 704, storage 706, a bus 708, one or more network processor unit(s) 710 interconnected with one or more network input/output (I/O) interface(s) 712, one or more I/O interface(s) 714, and control logic 720. In various embodiments, instructions associated with logic for computing device 700 can overlap in any manner and are not limited to the specific allocation of instructions and/or operations described herein.

In at least one embodiment, processor(s) 702 is/are at least one hardware processor configured to execute various tasks, operations and/or functions for computing device 700 as described herein according to software and/or instructions configured for computing device 700. Processor(s) 702 (e.g., a hardware processor) can execute any type of instructions associated with data to achieve the operations detailed herein. In one example, processor(s) 702 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 704 and/or storage 706 is/are configured to store data, information, software, and/or instructions associated with computing device 700, and/or logic configured for memory element(s) 704 and/or storage 706. For example, any logic described herein (e.g., control logic 720) can, in various embodiments, be stored for computing device 700 using any combination of memory element(s) 704 and/or storage 706. Note that in some embodiments, storage 706 can be consolidated with memory element(s) 704 (or vice versa), or can overlap/exist in any other suitable manner.

In at least one embodiment, bus 708 can be configured as an interface that enables one or more elements of computing device 700 to communicate in order to exchange information and/or data. Bus 708 can be implemented with any architecture designed for passing control, data and/or information between processors, memory elements/storage, peripheral devices, and/or any other hardware and/or software components that may be configured for computing device 700. In at least one embodiment, bus 708 may be implemented as a fast kernel-hosted interconnect, potentially using shared memory between processes (e.g., logic), which can enable efficient communication paths between the processes.

In various embodiments, network processor unit(s) 710 may enable communication between computing device 700 and other systems, entities, etc., via network I/O interface(s) 712 to facilitate operations discussed for various embodiments described herein. In various embodiments, network processor unit(s) 710 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 700 and other systems, entities, etc. to facilitate operations for various embodiments described herein. In various embodiments, network I/O interface(s) 712 can be configured as one or more Ethernet port(s), Fibre Channel ports, and/or any other I/O port(s) now known or hereafter developed. Thus, the network processor unit(s) 710 and/or network I/O interface(s) 712 may include suitable interfaces for receiving, transmitting, and/or otherwise communicating data and/or information in a network environment.

I/O interface(s) 714 allow for input and output of data and/or information with other entities that may be connected to computer device 700. For example, I/O interface(s) 714 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 720 can include instructions that, when executed, cause processor(s) 702 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 720) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 704 and/or storage 706 can store data, software, code, instructions (e.g., processor instructions), logic, parameters, combinations thereof, and/or the like used for operations described herein. This includes memory element(s) 704 and/or storage 706 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

VARIATIONS AND IMPLEMENTATIONS

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), VLAN, wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fib®), IEEE 802.16 (e.g., Worldwide Interoperability for Microwave Access (WiMAX)), Radio- Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the'(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
   at a control plane node of a Fifth Generation (5G) Core (5GC) of a 5G System (5GS), performing a handover procedure in relation to a Packet Data Network (PDN) connection that is managed, via a control signaling session, by a control plane node of an Evolved Packet Core (EPC) of an Evolved Packet System (EPS) and anchored at a user plane node for forwarding traffic associated with a user equipment (UE), including:

receiving, from the control plane node of the EPC via an N26 interface, a message which indicates a forward relocation request responsive to an indication of a handover of the PDN connection from the EPS to the 5GS, the message including a Mobility Management (MM) context of the UE and PDN connection information which includes an EPS bearer context of an EPS bearer of the PDN connection;

establishing a Protocol Data Unit (PDU) session that corresponds to the PDN connection based on the PDN connection information, including establishing a Quality of Service (QoS) Flow that corresponds to the EPS bearer based on the EPS bearer context; and sending, to the user plane node, a message which indicates a session modification request for session modification and management of the PDU session, via the control signaling session, at the user plane node for forwarding the traffic associated with the UE.

2. The method of claim 1, wherein establishing the QoS Flow comprises:

selecting a QoS Flow Identifier (QFI) of the QoS Flow that corresponds to an EPS Bearer ID (EBI) of the EPS bearer; and selecting a 5G QoS Identifier (5QI) of the QoS Flow that corresponds to a QoS Class Identifier (QCI) of the EPS bearer, and/or selecting QoS Flow parameters of the QoS Flow that corresponds to EPS bearer QoS parameters of the EPS bearer.

3. The method of claim 1, wherein the message which indicates the forward relocation request further includes a user plane node ID of the user plane node and a session ID of the control signaling session, and wherein sending the message which indicates the session modification request further comprises:

sending, to the user plane node associated with the user plane node ID, the message which indicates the session modification request for session modification and management of the PDU session at the user plane node via the control signaling session associated with the session ID.

4. The method of claim 3, wherein the message which indicates the session modification request includes a control plane node ID of the control plane node of the 5GC, and wherein sending the message which indicates the session modification request further comprises:

sending, to the user plane node associated with the user plane node ID, the message which indicates the session modification request for updating the user plane node with the control plane node ID of the control plane node of the 5GC for the control signaling session.

5. The method of claim 1, wherein the message further includes updated uplink (UL) tunnel information for the PDU session, and wherein sending the message which indicates the session modification request further comprises:

sending the message which indicates the session modification request for deleting, at the user plane node, existing tunnel information for the PDN connection, and for provisioning, at the user plane node, the updated UL tunnel information for the PDU session.

6. The method of claim 1, further comprising:
at the control plane node of the 5GC,
receiving, from the control plane node of the EPC, a message which includes updated downlink (DL) tunnel information for the PDU session; and sending a message which indicates another session modification request for provisioning, at the user plane node, the updated DL tunnel information for the PDU session.

7. The method of claim 1, wherein:
the control plane node of the 5GC comprises a 5GC control plane (CP) (5GC CP) unit,
the 5GC CP unit has functionality associated with an Access and Mobility Management Function (AMF) and a Session Management Function (SMF), and
the 5GC CP unit is without an externally exposed or connected N11 interface.

8. The method of claim 1, further comprising:
at the control plane node of the EPC,
receiving, from the control plane node of the 5GC via the N26 interface, a message which indicates a subsequent forward relocation request responsive to an indication of a subsequent handover of the PDU session from the 5GS to the EPS, the message including the MM context of the UE and PDU session information which includes QoS Flow information of the QoS Flow of the PDU session;

establishing a subsequent PDN connection that corresponds to the PDU session based on the PDU session information, including establishing a subsequent EPS bearer that corresponds to the QoS Flow based on the QoS Flow information; and sending, to the user plane node, a message which indicates a subsequent session modification request for session modification and management of the subsequent PDN connection, via the control signaling session, at the user plane node for forwarding the traffic associated with the UE.

9. A computer program product comprising:
a non-transitory computer readable medium;
instructions in the non-transitory computer readable medium;
the instructions being executable by one or more processors of a control plane node of a Fifth Generation (5G) Core (5GC) of a 5G System (5GS), for performing a handover procedure in relation to a Packet Data Network (PDN) connection that is managed, via a control signaling session, by a control plane node of an Evolved Packet Core (EPC) of an Evolved Packet System (EPS) and anchored at a user plane node for forwarding traffic associated with a user equipment (UE), including:

receiving, from the control plane node of the EPC via an N26 interface, a message which indicates a forward relocation request responsive to an indication of a handover of the PDN connection from the EPS to the 5GS, the message including a Mobility Management (MM) context of the UE and PDN connection information which includes an EPS bearer context of an EPS bearer of the PDN connection;

establishing a Protocol Data Unit (PDU) session that corresponds to the PDN connection based on the PDN connection information, including establishing a Quality of Service (QoS) Flow that corresponds to the EPS bearer based on the EPS bearer context; and sending, to the user plane node, a message which indicates a session modification request for session modification and management of the PDU session, via the control signaling session, at the user plane node for forwarding the traffic associated with the UE.

10. The computer program product of claim 9, wherein the instructions are further executable for establishing the QoS Flow by:
- selecting a QoS Flow Identifier (QFI) of the QoS Flow that corresponds to an EPS Bearer ID (EBI) of the EPS bearer; and
- selecting a 5G QoS Identifier (5QI) of the QoS Flow that corresponds to a QoS Class Identifier (QCI) of the EPS bearer, and/or selecting QoS Flow parameters of the QoS Flow that corresponds to EPS bearer QoS parameters of the EPS bearer.

11. The computer program product of claim 9, wherein the message which indicates the forward relocation request further includes a user plane node ID of the user plane node and a session ID of the control signaling session, and sending the message which indicates the session modification request further comprises:
- sending, to the user plane node associated with the user plane node ID, the message which indicates the session modification request for session modification and management of the PDU session at the user plane node via the control signaling session associated with the session ID.

12. The computer program product of claim 11, wherein the message which indicates the session modification request includes a control plane node ID of the control plane node of the 5GC, and sending the message which indicates the session modification request further comprises:
- sending, to the user plane node associated with the control plane node ID, the message which indicates the session modification request for updating the user plane node with the control plane node ID of the control plane node of the 5GC for the control signaling session.

13. The computer program product of claim 9, wherein the message further includes updated uplink (UL) tunnel information for the PDU session, and sending the message which indicates the session modification request further comprises:
- sending the message which indicates the session modification request for deleting, at the user plane node, existing tunnel information, and for provisioning, at the user plane node, the updated UL tunnel information for the PDU session.

14. A method comprising:
- at a control plane node of an Evolved Packet Core (EPC) of an Evolved Packet System (EPS), performing a mobility procedure in relation to a Protocol Data Unit (PDU) session that is managed, via a control signaling session, by a control plane node of a Fifth Generation (5G) Core (5GC) of a 5G System (5GS) and anchored at a user plane node for forwarding traffic associated with a user equipment (UE), including:
  - sending, to the control plane node of the 5GC via an N26 interface, a message which indicates a context request responsive to an indication of mobility of the PDU session from the 5GS to the EPS;
  - receiving, from the control plane node of the 5GC via the N26 interface, a message which indicates a context response, the message including a Mobility Management (MM) context of the UE and Packet Data Network (PDN) connection information that is based on PDU session information of the PDU session, and including an EPS bearer context that is based on Quality of Service (QoS) flow information of a QoS Flow of the PDU session;
  - establishing a PDN connection that corresponds to the PDU session based on the PDN connection information, including establishing an EPS bearer that corresponds to the QoS Flow based on the EPS bearer context; and
  - sending, to the user plane node, a message which indicates a session modification request for session modification and management of the PDN connection, via the control signaling session, at the user plane node for forwarding the traffic associated with the UE.

15. The method of claim 14, wherein the message which indicates the context response further includes a user plane node ID of the user plane node and a session ID of the control signaling session, and sending the message which indicates the session modification request further comprises:
- sending, to the user plane node associated with the user plane node ID, the message which indicates the session modification request for session modification and management of the PDN connection at the user plane node via the control signaling session associated with the session ID.

16. The method of claim 15, wherein the message which indicates the session modification request includes a control plane node ID of the control plane node of the EPC, and sending the message which indicates the session modification request further comprises:
- sending, to the user plane node associated with the user plane node ID, the message which indicates the session modification request for session modification and management of the PDN connection at the user plane node via the control signaling session associated with the session ID, and for updating the user plane node with the control plane node ID of the control plane node of the EPC for the control signaling session.

17. The method of claim 14, wherein the message further includes updated uplink (UL) tunnel information for the PDN connection, and sending the message which indicates the session modification request further comprises:
- sending the message which indicates the session modification request for deleting, at the user plane node, existing tunnel information for the PDU session, and for provisioning, at the user plane node, the updated UL tunnel information for the PDN connection.

18. The method of claim 14, further comprising:
- at the control plane node for 5GC, selecting the PDN connection information corresponding to the PDU session information, including:
  - selecting an EPS Bearer ID (EBI) of the EPS bearer that corresponds to a QoS Flow Identifier (QFI) of the QoS Flow, and
  - selecting EPS bearer QoS parameters of the EPS bearer that corresponds to QoS Flow parameters of the QoS Flow, and/or selecting a QoS Class Identifier (QCI) of the EPS bearer that corresponds to a 5G QoS Identifier (5QI) of the QoS Flow.

19. The method of claim 14, wherein:
- the control plane node of the EPC comprises an EPC control plane (CP) (EPC CP) unit,
- the EPC CP unit has functionality associated with a Mobility Management Entity (MME), a Serving Gateway-Control Plane (SGW-C), and a PDN Gateway-Control Plane (PGW-C), and
- the EPC CP unit is without externally exposed or connected S11, S5, and S8 interfaces.

20. The method of claim 14, further comprising
- at the control plane node of the 5GC,
  - sending, to the control plane node of the EPC via the N26 interface, a message which indicates a subsequent context request responsive to an indication of subsequent mobility of the PDN connection from the EPS to the 5GS;

receiving, from the control plane node of the EPC via the N26 interface, a message which indicates a subsequent context response, the message including the MM context of the UE and subsequent PDU session information that is based on the PDN connection information of the PDN connection, and including subsequent QoS flow information that is based on the EPS bearer context of the EPS bearer of the PDN connection;

establishing a subsequent PDU session that corresponds to the PDN connection based on the subsequent PDU session information, including establishing a subsequent QoS Flow that corresponds to the EPS bearer based on the subsequent QoS flow information; and sending, to the user plane node, a message which indicates a subsequent session modification request for session modification and management of the subsequent PDU session, via the control signaling session, at the user plane node for forwarding the traffic associated with the UE.

* * * * *